Patented Sept. 26, 1950

2,523,264

UNITED STATES PATENT OFFICE 2,523,264

OPHTHALMIC GLASS

William H. Armistead, Corning, N. Y., assignor to Corning Glass Works, Corning, N. Y., a corporation of New York No Drawing. Application June 30, 1947,
Serial No. 758,233

8 Claims. (Cl. 106—53)

This invention, which is a continuation in part of my pending application Serial Number 691,663 filed August 19, 1946, now issued as Patent 2,433,883, relates to transparent ophthalmic glasses, small buttons of which are to be sealed into lenses of crown glass for the production of multifocal spectacle lenses. lasses which are to be used for this purpose must meet certain requirements. Above all, they must seal properly with standard white optical crown glass which has a thermal expansion coefficient of $93 \times 10^{-7}$ cm. per cm. per degree C. and a softening point of about 725° C. Softening point is that temperature at which a fibre of the glass of specified size will elongate under its own weight at a given rate when suspended through a small furnace of specified dimensions (Viscosity of Glass between the Strain Point and Melting Temperature, by H. R. Lillie, Jour. Am. Cer. Soc., vol. 14, page 502, July 1931). They must have good devitrification resistance during sealing and adequate chemical durability or resistance to weathering. Their purpose requires an index of refraction for the D line $(nD)$ between 1.57 and 1.70 and it is desirable that they have a dispersive index $(\nu)$ which is as high as possible. Prior ophthalmic glasses of high refractive index have a maximum dispersive index of about 32 which is less than desired. The prior glasses of lower refractive index have a maximum dispersive index of about 50 but have insufficient chemical durability.

The primary object of this invention is to provide ophthalmic glasses which have higher dispersive indices than have hitherto been obtainable in glasses of this type without sacrifice of other desirable properties.

Another object is to provide ophthalmic glasses having optical properties ranging from $nD=1.70$, preferably $nD=1.65$, $\nu=46$, to $nD=1.57$, preferably $nD=1.59$, $\nu=53$, but having at the same time good chemical durability, softening points below 700° C. and thermal expansion coefficients between 83 and $95 \times 10^{-7}$ cm. per cm. per degree C.

In general, I have found that the above objects may be attained with glasses comprising 33% to 60% $SiO_2$, 1% to 70% $B_2O_3$, 2% to 15% $ZrO_2$, 0% to 25% BaO, .3% to 5% $Li_2O$, 1% to 15% $Na_2O$, 0% to 10% PbO, and an oxide of at least one metal of the second periodic group whose atomic weight is between 40 and 113, namely, Ca, Zn, Sr or Cd, collectively amounting to from 3% to 30% but individually amounting to less than 15%, the glass containing at least two bivalent metal oxides and the total percentage of such bivalent metal oxides being not less than 15% and not over 50%. In lieu of $Na_2O$, $K_2O$ may be substituted wholly or in part.

For the present purpose the outstanding fault of prior glasses is their high dispersion for light of different wave lengths, that is, their low dispersive index, which causes excessive color aberration. Although it may be absent, the present glasses preferably should contain at least 5% BaO, because BaO raises the refractive index without unduly lowering the dispersive index. More than 25% BaO may cause devitrification. Since the use of BaO in substantial amounts tends to raise the liquidus temperature of the glass objectionably, it is necessary to include one or more other bivalent oxides to prevent or counteract this. Other bivalent oxides which are useful for this purpose are PbO, CaO, ZnO, SrO and CdO.

The use of PbO in small amounts is not essential but in some instances is desirable because it raises the refractive index and helps to soften the glass. Since PbO tends to lower the dispersive index excessively, not more than about 10% thereof may be used.

CaO, ZnO, SrO and CdO also raise the refractive index. They are particularly valuable for further increasing the refractive index without causing devitrification in glasses having large BaO contents, but may also be added to the glass irrespective of the presence or absence of BaO. Up to 15% of each may thus be employed, provided their total does not exceed 30%. Other oxides, if desired, may be added with benefit as follows:

Up to 8% but preferably not over 5% $Al_2O_3$ may be added, preferably but not necessarily in lieu of $SiO_2$. Such addition increases the resistance of the glass to devitrification.

$TiO_2$ may be incorporated in the glass with advantage to the optical properties and chemical durability. Both $TiO_2$ and $ZrO_2$ tend to raise the refractive index of the glass more than the other constituents but, whereas $ZrO_2$ has only a slight effect on the dispersive index, $TiO_2$ has a strong depressing effect on it. Hence, I prefer to use as much $ZrO_2$, between 2% and 15%, as will dissolve in the glass and to add as much $TiO_2$ as possible without unduly lowering the dispersive index. Up to 10% or more $TiO_2$ may thus be added.

The expansion coefficient for suitable sealing to the standard optical crown glass will vary somewhat with softening point and with composition, and the new glasses will seal satisfactorily if their expansion coefficients are between $83\times10^{-7}$ and $94\times10^{-7}$ cm. per cm. per degree C.

The following compositions in weight percentage as calculated from their batches are given by way of example but not as limitations of the invention:

|  | 1 | 2 | 3 | 4 |
|---|---|---|---|---|
| SiO$_2$ | 39 | 39 | 45.5 | 37 |
| B$_2$O$_3$ | 2 | 2 | 4 | 2 |
| ZrO$_2$ | 5.5 | 5.5 | 7 | 8 |
| BaO | 20 | 20 | 20 | 20 |
| ZnO | 3 | 3 |  |  |
| Li$_2$O | 1 | 2 | .5 | 1 |
| Na$_2$O | 4.5 | 3.5 | 9.5 | 5 |
| Al$_2$O$_3$ | 2 | 2 |  | 2 |
| CaO | 7 | 7 | 5 | 10 |
| TiO$_2$ | 4 | 4 | 2.5 |  |
| PbO |  |  |  | 5 |
| CdO | 12 | 12 | 6 | 10 |
| Softening point, °C | 690 | 670 | 691 | 699 |
| Exp. Coeff. $\times 10^7$ | 85 | 88 | 91 | 92 |
| $n$D | 1.659 | 1.660 | 1.616 | 1.680 |
| $\nu$ | 45.3 | 45.5 | 49.4 | 43.2 |

It is characteristic of the new glasses that they contain a substantial amount of ZrO$_2$. Commercial ZrO$_2$ sometimes contains a small amount of uranium as an impurity which is sufficient to cause fluorescence in bright light. This sometimes creates the appearance of an objectionable fog or haziness before the eyes when spectacle lenses composed of such glasses are worn in strong light. I have found that the objectionable fluorescence can be prevented by melting the glass under reducing conditions or by the addition of a small amount of SnO$_2$. The latter decomposes sufficiently during melting to cause reduction of the uranium to a lower valence which does not fluoresce.

I claim:

1. An ophthalmic glass which comprises 33% to 60% SiO$_2$, 1% to 7% B$_2$O$_3$, 2% to 15% ZrO$_2$, 0.3% to 5% Li$_2$O, 1% to 15% of an alkali metal oxide selected from the group consisting of Na$_2$O, K$_2$O, and mixtures of Na$_2$O and K$_2$O, and at least two bivalent metal oxides in the indicated proportions selected from the group consisting of up to 25% BaO, up to 10% PbO, 3% to 15% CaO, 3% to 15% ZnO, 3% to 15% SrO, 3% to 15% CdO, and 3% to 30% of a mixture of SrO and CdO, the maximum proportion of either SrO or CdO in said mixture being 15%, the selected bivalent metal oxides including an oxide selected from the group consisting of SrO, CdO, and a mixture of SrO and CdO in the above-indicated proportion, the total of the bivalent metal oxides being between 15% and 50%, the softening point of the glass being below 700° C., the refractive index ($n$D) being between 1.57 and 1.70 and the thermal expansion coefficient being between $83\times10^{-7}$ and $95\times10^{-7}$ cm. per cm. per °C. between 0° C. and 300° C.

2. An ophthalmic glass which comprises 33% to 60% SiO$_2$, 1% to 7% B$_2$O$_3$, 2% to 15% ZrO$_2$, 0.3% to 5% Li$_2$O, 1% to 15% of an alkali metal oxide selected from the group consisting of Na$_2$O, K$_2$O, and mixtures of Na$_2$O and K$_2$O, and at least two bivalent metal oxides in the indicated proportions selected from the group consisting of up to 25% BaO, up to 10% PbO, 3% to 15% CaO, 3% to 15% ZnO, 3% to 15% SrO, 3% to 15% CdO, and 3% to 30% of a mixture of SrO and CdO, the maximum proportion of either SrO or CdO in said mixture being 15%, the selected bivalent metal oxides including BaO and an oxide selected from the group consisting of SrO, CdO, and a mixture of SrO and CdO in the above-indicated proportions, the total of the bivalent metal oxides being between 15% and 50%, the softening point of the glass being below 700° C., the refractive index ($n$D) being between 1.57 and 1.70 and the thermal expansion coefficient being between $83\times10^{-7}$ and $95\times10^{-7}$ cm. per cm. per °C. between 0° and 300° C.

3. An ophthalmic glass which comprises 33% to 60% SiO$_2$, 1% to 7% B$_2$O$_3$, 2% to 15% ZrO$_2$, 0.3% to 5% Li$_2$O, 1% to 15% of an alkali metal oxide selected from the group consisting of Na$_2$O, K$_2$O, and mixtures of Na$_2$O and K$_2$O, and at least two bivalent metal oxides in the indicated proportions selected from the group consisting of 5% to 25% BaO, up to 10% PbO, 3% to 15% CaO, 3% to 15% ZnO, 3% to 15% SrO, and 3% to 15% CdO, the selected bivalent metal oxides including BaO and CdO in the above-indicated proportions, the total of the bivalent metal oxides being between 15% and 50%, the softening point of the glass being below 700° C., the refractive index ($n$D) being between 1.57 and 1.70 and the thermal expansion coefficient being between $83\times10^{-7}$ and $95\times10^{-7}$ cm. per cm. per °C. between 0° and 300° C.

4. An ophthalmic glass which comprises 33% to 60% SiO$_2$, 1% to 7% B$_2$O$_3$, 2% to 15% ZrO$_2$, 0.3% to 5% Li$_2$O, 1% to 15% of an alkali metal oxide selected from the group consisting of Na$_2$O, K$_2$O, and mixtures of Na$_2$O and K$_2$O, and at least two bivalent metal oxides in the indicated proportions selected from the group consisting of 5% to 25% BaO, up to 10% PbO, 3% to 15% CaO, 3% to 15% ZnO, 3% to 15% SrO, and 3% to 15% CdO, the selected bivalent metal oxides including BaO and SrO in the above-indicated proportions, the total of the bivalent metal oxides being between 15% and 50%, the softening point of the glass being below 700° C., the refractive index ($n$D) being between 1.57 and 1.70 and the thermal expansion coefficient being between $83\times10^{-7}$ and $95\times10^{-7}$ cm. per cm. per °C. between 0° and 300° C.

5. An ophthalmic glass which comprises 33% to 60% SiO$_2$, 1% to 7% B$_2$O$_3$, 2% to 15% ZrO$_2$, 0.3% to 5% Li$_2$O, 1% to 15% of an alkali metal oxide selected from the group consisting of Na$_2$O, K$_2$O, and mixtures of Na$_2$O and K$_2$O, up to 8% Al$_2$O$_3$, and at least two bivalent metal oxides in the indicated proportions selected from the group consisting of up to 25% BaO, up to 10% PbO, 3% to 15% CaO, 3% to 15% ZnO, 3% to 15% SrO, 3% to 15% CdO, and 3% to 30% of a mixture of SrO and CdO, the maximum proportion of either SrO or CdO in said mixture being 15%, the selected bivalent metal oxides including BaO and an oxide selected from the group consisting of SrO, CdO, and a mixture of SrO and CdO in the above-indicated proportions, the total of the bivalent metal oxides being between 15% and 50%, the softening point of the glass being below 700° C., the refractive index ($n$D) being between 1.57 and 1.70 and the thermal expansion coefficient being between $83\times10^{-7}$ and $95\times10^{-7}$ cm. per cm. per °C. between 0° and 300° C.

6. An ophthalmic glass which comprises 33% to 60% SiO$_2$, 1% to 7% B$_2$O$_3$, 2% to 15% ZrO$_2$, 0.3% to 5% Li$_2$O, 1% to 15% of an alkali metal oxide selected from the group consisting of Na$_2$O, K$_2$O, and mixtures of Na$_2$O and K$_2$O, up to 10% TiO$_2$, and at least two bivalent metal oxides in the indicated proportions selected from the group consisting of up to 25% BaO, up to 10% PbO, 3% to 15% CaO, 3% to 15% ZnO, 3% to 15% SrO, 3% to 15% CdO, and 3% to 30% of a mixture of SrO and CdO, the maximum proportion of either SrO or CdO in said mixture being 15%, the selected bivalent metal oxides including BaO and an oxide selected from the group consisting of SrO, CdO, and a mixture of SrO and CdO in the above-indicated proportions, the total of the bivalent metal oxides being between 15% and 50%, the softening point of the glass being below 700° C., the refractive index ($nD$) being between 1.57 and 1.70 and the thermal expansion coefficient being between $83 \times 10^{-7}$ and $95 \times 10^{-7}$ cm. per cm. per °C. between 0° and 300° C.

7. An ophthalmic glass which comprises 33% to 60% $SiO_2$, 1% to 7% $B_2O_3$, 2% to 15% $ZrO_2$, 0.3% to 5% $Li_2O$, 1% to 15% of an alkali metal oxide selected from the group consisting of $Na_2O$, $K_2O$, and mixtures of $Na_2O$ and $K_2O$, up to 8% $Al_2O_3$, up to 10% $TiO_2$, and at least two bivalent metal oxides in the indicated proportions selected from the group consisting of up to 25% BaO, up to 10% PbO, 3% to 15% CaO, 3% to 15% ZnO, 3% to 15% SrO, 3% to 15% CdO, and 3% to 30% of a mixture of SrO and CdO, the maximum proportion of either SrO or CdO in said mixture being 15%, the selected bivalent metal oxides including BaO and an oxide selected from the group consisting of SrO, CdO, and a mixture of SrO and CdO in the above-indicated proportions, the total of the bivalent metal oxides being between 15% and 50%, the softening point of the glass being below 700° C., the refractive index ($nD$) being between 1.57 and 1.70 and the thermal expansion coefficient being between $83 \times 10^{-7}$ and $95 \times 10^{-7}$ cm. per cm. per °C. between 0° and 300° C.

8. An ophthalmic glass which comprises 33% to 60% $SiO_2$, 1% to 7% $B_2O_3$, 2% to 15% $ZrO_2$, 0.3% to 5% $Li_2O$, 1% to 15% of an alkali metal oxide selected from the group consisting of $Na_2O$, $K_2O$, and mixtures of $Na_2O$ and $K_2O$, and at least three bivalent metal oxides in the indicated proportions selected from the group consisting of up to 25% BaO, up to 10% PbO, 3% to 15% CaO, 3% to 15% ZnO, 3% to 15% SrO, 3% to 15% CdO, and 3% to 30% of a mixture of SrO and CdO, the maximum proportion of either SrO or CdO in said mixture being 15%, the selected bivalent metal oxides including BaO, PbO and an oxide selected from the group consisting of SrO, CdO, and a mixture of SrO and CdO in the above-indicated proportions, the total of the bivalent metal oxides being between 15% and 50%, the softening point of the glass being below 700° C., the refractive index ($nD$) being between 1.57 and 1.70 and the thermal expansion coefficient being between $83 \times 10^{-7}$ and $95 \times 10^{-7}$ cm. per cm. per °C. between 0° and 300° C.

WILLIAM H. ARMISTEAD.

No references cited.

Certificate of Correction

Patent No. 2,523,264　　　　　　　　　　　　　　　　September 26, 1950

WILLIAM H. ARMISTEAD

It is hereby certified that error appears in the printed specification of the above numbered patent requiring correction as follows:

Column 1, line 7, for "lasses" read *Glasses*; line 46, for "70%" read 7%; and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*